(12) United States Patent
Frazier et al.

(10) Patent No.: US 8,041,802 B2
(45) Date of Patent: *Oct. 18, 2011

(54) DECOUPLED LOGICAL AND PHYSICAL DATA STORAGE WITHIN A DATABASE MANAGEMENT SYSTEM

(75) Inventors: Peter Frazier, Princeton, NJ (US); Paul Andersen, San Diego, CA (US); Gary Boggs, San Diego, CA (US); Criselda Carrillo, San Diego, CA (US); Donn Holtzman, San Diego, CA (US); John Mark Morris, San Diego, CA (US); P. Keith Muller, San Diego, CA (US); Paul Rubio, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,716

(22) Filed: Nov. 30, 2009

(65) Prior Publication Data

US 2010/0153531 A1    Jun. 17, 2010

Related U.S. Application Data

(63) Continuation of application No. 11/745,475, filed on May 8, 2007, now Pat. No. 7,730,171.

(51) Int. Cl.
*G06F 15/173* (2006.01)
*G06F 15/177* (2006.01)

(52) U.S. Cl. ......... 709/223; 709/220; 709/224; 709/226

(58) Field of Classification Search .................. 709/220, 709/223, 224, 226
See application file for complete search history.

(56) References Cited

U.S. PATENT DOCUMENTS

| | | | |
|---|---|---|---|
| 5,799,173 A | 8/1998 | Gossler et al. | |
| 5,983,281 A | 11/1999 | Ogle et al. | |
| 6,195,680 B1 | 2/2001 | Goldszmidt et al. | |
| 6,259,705 B1 | 7/2001 | Takahashi et al. | |
| 6,425,007 B1 | 7/2002 | Messinger | |
| 6,438,595 B1 | 8/2002 | Blumenau et al. | |
| 6,671,259 B1 | 12/2003 | He et al. | |
| 6,745,241 B1 | 6/2004 | French et al. | |
| 6,880,156 B1 | 4/2005 | Landherr et al. | |
| 7,080,378 B1 | 7/2006 | Noland et al. | |
| 7,730,171 B2 * | 6/2010 | Frazier et al. | ......... 709/223 |
| 2005/0193113 A1 | 9/2005 | Kokusho et al. | |
| 2006/0224706 A1 | 10/2006 | Kudo et al. | |
| 2007/0233843 A1 | 10/2007 | Frey et al. | |

OTHER PUBLICATIONS

"U.S. Appl. No. 11/745,475, Non-Final Office Action mailed Apr. 10, 2009", 13 pgs.
"U.S. Appl. No. 11/745,475, Response filed Jul. 10, 2009 to Non Final Office Action mailed Apr. 10, 2009", 10 pgs.
Ghandeharizadeh, S., et al., "An Algorithm for Disk Space Management to Minimize Seeks", (Mar. 16, 1995), 9 pgs.
Ghandeharizadeh, S., et al., "An Online Algorithm to Optimize File Layout in a Dynamic Environment", (Oct. 24, 1995), 16 pgs.

\* cited by examiner

*Primary Examiner* — Hussein Elchanti
(74) *Attorney, Agent, or Firm* — Schwegmen, Lundberg & Woessner

(57) ABSTRACT

The subject matter herein relates to database management systems and, more particularly, to decoupled logical and physical data storage within a database management system. Various embodiments provide systems, methods, and software that separate physical storage of data from logical storage of data. These embodiments include a mapping of logical storage to physical storage to allow data to be moved within the physical storage to increase database responsiveness.

16 Claims, 4 Drawing Sheets

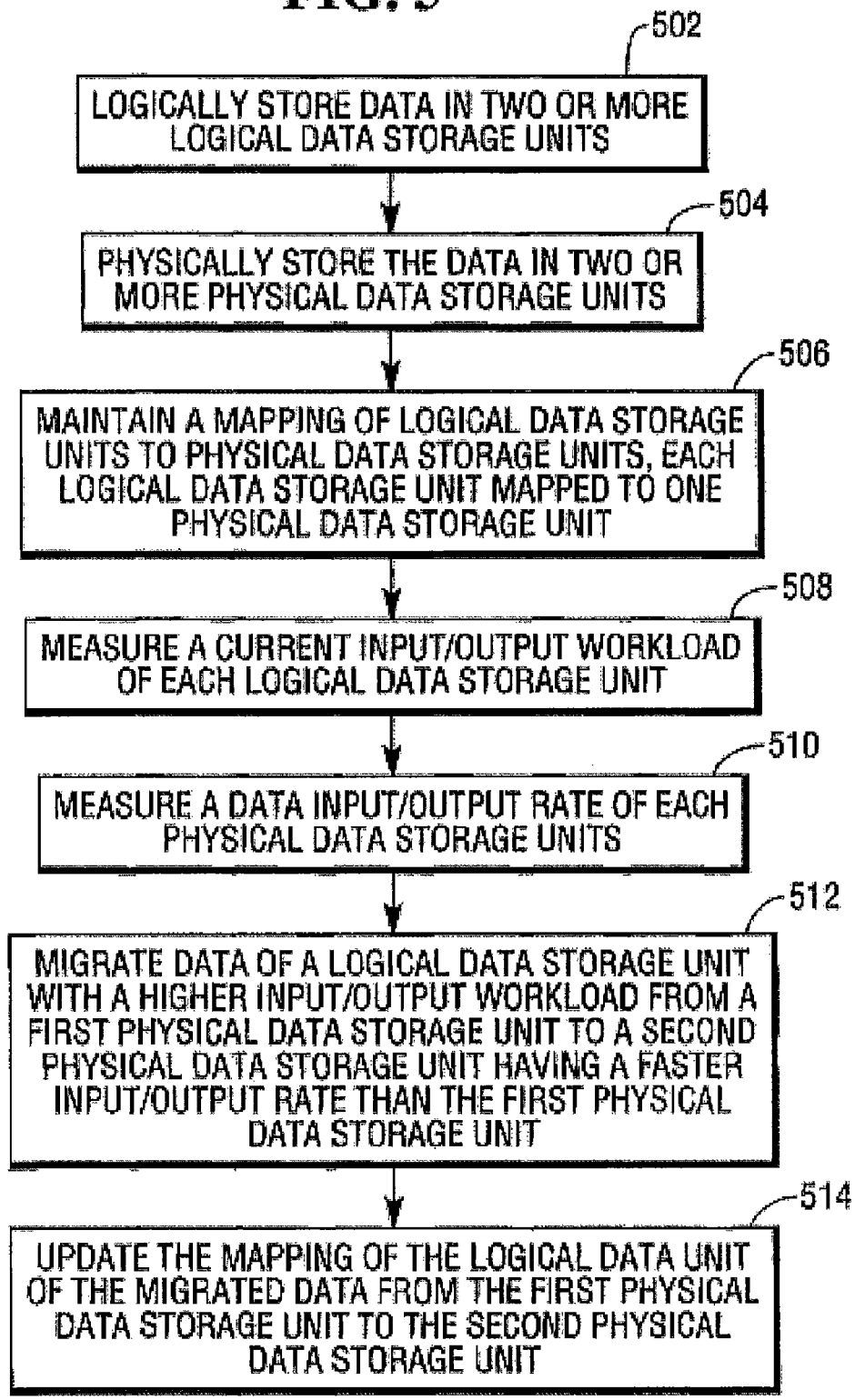

DECOUPLED LOGICAL AND PHYSICAL DATA STORAGE WITHIN A DATABASE MANAGEMENT SYSTEM

RELATED APPLICATION

This application is a Continuation of U.S. application Ser. No. 11/745,475, filed on May 8, 2007 now U.S. Pat. No. 7,730,171, which is incorporated herein by reference in its entirety.

TECHNICAL FIELD

The subject matter herein relates to database management systems and, more particularly, to decoupled logical and physical data storage within a database management system.

BACKGROUND INFORMATION

Database performance is critical to many organizations. Slow database response time can reduce worker productivity and slow operation of software systems that access and manipulate data in databases.

Database administrators monitor database performance and modify and update database configurations to improve performance. This may include updating indexes and database statistics used by query optimization processes. Database administrators may also defragment data stored on storage devices to provide continuous blocks of data to reduce disk seek time. These efforts may improve database performance, but database latency still exists.

To further improve database performance, database administrators have manually moved data estimated to be used most frequently to faster storage devices. However, the frequency at which data is accessed changes over time. Thus, performance gains from such efforts are commonly short lived and must be manually repeated to maintain the improved performance.

BRIEF DESCRIPTION OF THE DRAWINGS

FIG. 5 is a block flow diagram of a method according to an example embodiment.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
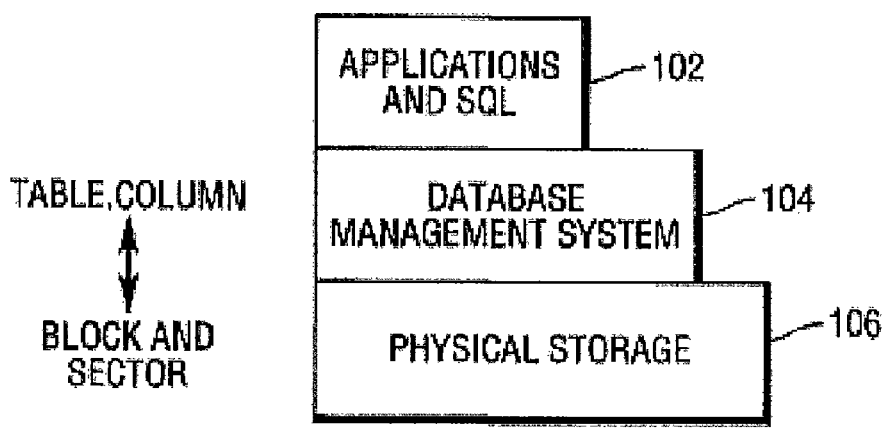
FIG. 1 is a logical block diagram of prior art data storage in a database management system.

FIG. 1 is a logical block diagram of a prior art data storage architecture 100 of a database management system. In such an architecture, when applications and structured query language ("SQL") statements 102 are issued to manipulate data in a database management system 104, the database management system 104 translates the SQL directly into block and sector addresses of data stored in physical storage 106.

The physical storage typically includes hard disk devices. Hard disk devices include one or more disks. Data written on an outside of a disk is generally more quickly available than data written on an inner portion of a disk. As a result, physical storage devices normally have portions of the one or more disks that have a higher data input/output rate than other portions.

Figure 2:
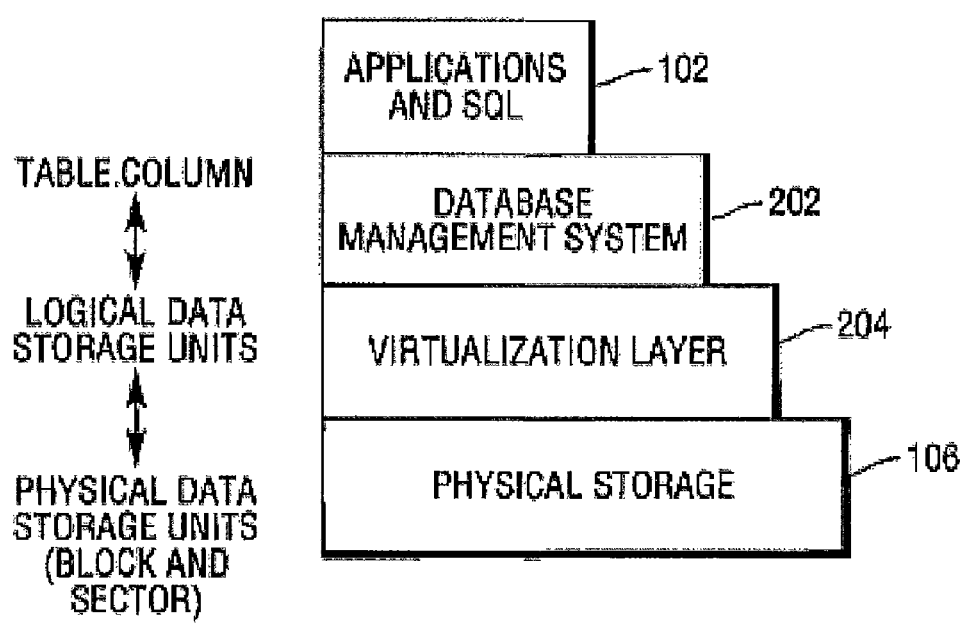
FIG. 2 is a logical block diagram of decoupled logical and physical storage of data in a database management system according to an example embodiment.

FIG. 2 is a logical block diagram of a decoupled logical and physical data storage architecture 200 in a database management system according to an example embodiment. Such embodiments include the applications and SQL 102 and the physical storage 106 as in the architecture 100 of FIG. 1. However, the architecture 200 of FIG. 2 includes a database management system 202 that receives table and column references from the applications and SQL and translates the table and column references into logical data storage unit identifiers according to a mapping in a virtualization layer 204. The virtualization layer 204 further includes a mapping of logical data storage unit identifiers to physical data storage units, such as block and sector addresses of data stored in the physical storage 106.

Embodiments including the architecture 200 of FIG. 2 decouple logical references to data from the physical storage of the data. As a results, data may be moved around in the physical storage 106 without affecting logical references to data. This ability allows data that is accessed more frequently to be moved to the faster portions of the physical storage 106 and the infrequently accessed data to be moved to the slower portions of the physical storage 106. Performance of database management systems 202 including such an architecture 200 may be improved by organizing data in such a fashion.

In some embodiments, a system built on the architecture 200 of FIG. 2 measures the current I/O workload and adds the current workload to an amalgamation of workload data collected over time. The system then considers the current layout of data in physical storage and, using a model of response time calibrated from measurements, calculates the effect of data migrations on overall system average response time. The system chooses a set of data migrations, taking into account the current system workload that will improve this overall system average response time and executes it while the workload is running. In some embodiments, this process is continuous. In other embodiments, the process is periodic. The process, in such embodiments, allows the physical data arrangement to be dynamically adjusted to adapt to changing workloads.

Some embodiments use a linear approximation of the performance of the I/O system which is accurate for the current layout and for small deviations from it. Such embodiments use linear approximation to improve the layout a little bit, then adjusts the approximation to this new and improved layout. The system continues incrementally improving the layout using this method and, since average response time is a convex function of layout, this myopic gradient descent eventually reaches the global optimal layout.

Such embodiments are enabled by a file system that decouples the data from its physical location. Data is chunked into equally sized logical extents, and physical storage is chunked into equally sized physical extents. The file system stores a mapping between logical and physical extents, which determines where data is actually stored. This mapping is flexible and can be changed at runtime, allowing online migration of application data from physical location to physical location. This migration is transparent to applications except for the temporary performance penalty of moving the data and the permanent performance benefit of having the data in a better physical location. However, some embodiments mitigate the performance penalty of moving the data by moving the data during system idle time or during scheduled periods.

Unallocated physical extents in physical storage are considered occupied by phantom logical extents. As with logical extents containing application data, some embodiments also predict that phantom extents will have I/Os accessing them in the future, but this prediction is based the likelihood of their future allocation rather than on their current workload. In this sense they are placeholders for possible future allocations, and enable the automatic extension of an algorithm that does not consider allocations explicitly to also handle allocations. Therefore, phantom logical extents are treated almost identically to logical extents containing data. The only difference between them is that it is cheaper to migrate phantom logical extents because doing so is just moving placeholders—no I/O need be performed.

Some embodiments may require that the average of an extents workload and response time is a good estimate of the extents workload and response time in the future. In other words, a solution may require that the workload does not vary too quickly. In practice this requirement is met by taking the average over a sufficiently long period of time, i.e. over days or weeks rather than minutes. Some embodiments may also be implemented with more advanced measurement techniques. For example, periodic peaks in workload due to high activity periods on a database-backed website, or to nightly batch processing, can be modeled and predicted using seasonal exponential smoothing.

Typical embodiments model each logical extent as having a single temperature, i.e. a number of I/Os per second accessing the data in that logical extent, and each physical extent as having a single average response time. Some embodiments function better when the I/O workload is dominated by I/Os of a single size or small range of sizes, and for which changes in read/write ratio do not greatly disturb measured response times. This is because it assumes that average response times do not change by very much when a small number of logical extents are moved.

Measuring Temperature and Response Time

As mentioned above, typical embodiments model each logical extent as having a single temperature, i.e. a number of I/Os per second accessing the data in that logical extent, and each physical extent as having a single average response time.

Such embodiments measure temperature and response time from the I/O workload on a per-extent basis using a technique called exponential smoothing. To measure temperature, each logical extent has two integers associated with it: a value and an accumulator. Both are initialized to 0. Each I/O that accesses the logical extent increments the accumulator, and then at a fixed interval, such as once a minute, the accumulator is incorporated into the value via an operation such as:

$$value=(1-c)*Value+c*Accumulator$$

Where c is a fixed parameter between 0 and 1. After the value is updated, the accumulator is zeroed. Value is essentially a running average of the number of I/Os per minute, and c controls over how many minutes the average is taken.

To measure response time, a value is associated with each physical extent, and after each I/O that accesses the physical extent, the value is updated via an operation such as:

$$value=(1-c)*Value+c*Rsptime$$

The response time value may be initialized to zero, or may be set using random I/Os issued during a brief grading period when the system starts up. Note that this method of measuring response time weights busy periods more heavily than idle periods. This is desirable, in some embodiments, because heavy I/O can accentuate the effect of workload imbalance on response time and, in such embodiments and situations, the goal is balancing response time.

A number of variations on this basic measurement method may be employed. For example:
- In workloads with different I/O sizes, we record I/O response times only for I/Os with a size in a certain window. If we did not do this, a logical extent with many large I/Os migrated to some fast physical extent would appear to slow that extent. The I/O size window should be chosen at startup time and should represent the I/O size that accounts for the largest part of average overall system response time.
- The response time updates may be batched to reduce computational overhead.
- Physical extents that have not been measured recently may have read I/Os issued to them to measure their response times. This is called probing.
- Measurements may be made as described above, but then extents with similar characteristics may be grouped into bins. The Migration Choosing part of this invention would then assume that all logical extents in a logical extent bin have the same temperature, likely calculated as the average of the temperatures in the bin, and similarly with physical extents in a physical extent bin. This would make the task of choosing migrations computationally easier. If binning were done using some a priori knowledge, e.g. physical extents from the same disk zone have similar response times, binning could give more accurate measurements.

Average Response Time and the Ideal Layout

Given a mapping of logical to physical extents, and measurements of temperature and response time, in some embodiments, the average response time for the layout may be given by:

$$\text{AvgRspTime} = \Sigma_i T_i R_i$$

where the logical/physical extent pairs are indexed by the variable i, and the sum is over all logical/physical extent pairs including pairs with phantom logical extents. Ti is the measured temperature (i.e. #I/Os per second) of the logical extent in the $i^{th}$ pair, and Ri is the measured response time of the physical extent in the $i^{th}$ pair. Some embodiments choose migrations to move from the current layout to layouts with lower average response times. The ideal layout is the one with the lowest average response time. Some embodiments may compute an ideal layout by:
1. Sorting the logical extents in order of decreasing temperature (hottest are first).
2. Sorting the physical extents in order of increasing response time (fastest are first).
3. Pairing logical and physical extents with the same rank (i.e. hottest logical extent on fastest physical extent).

Although changes in response time caused by changes in device utilization or seek distance are not explicitly included in the model of such embodiments, the layouts chosen by this algorithm will optimize these quantities. First consider utilization. Physical extents on devices with high utilizations will appear slow because I/Os to those devices will have longer wait times. The natural act of moving hot logical extents off of slow physical extents will reduce the utilization on overloaded devices, balancing the load. Now consider seek times. The physical extents close to the current location of a very hot logical extent will appear faster because the head is often there and seek distances are smaller. This will cause other hot logical extents to choose to migrate there rather than somewhere else on the storage device. This tends to clump the hot logical extents on a storage device into one location on that storage device, reducing seek times.

Choosing Migrations

Now we would like to move from the current layout to the ideal layout by choosing migrations, in some embodiments, that make the largest immediate improvement in average response time. Such embodiments concentrate on immediate improvement because the workload changes continually, so any small improvements made today in preparation for large improvements tomorrow may be wasted if the workload changes. In fact, since the ideal layout is continually changing by small amounts, it may never be reached. Instead, these embodiments stay close enough to the ideal to improve performance.

The following example computes the improvement due to switching two logical extents j and k.

$$\text{Old AvgRsptime} = T_j R_j + T_k R_k + \Sigma_{i \neq j,k} T_i R_i$$

$$\text{New AvgRsptime} = T_j R_k + T_k R_j + \Sigma_{i \neq j,k} T_i R_i$$

$$\text{Old-New AvgRsptime} = (T_j R_j + T_k R_k) - (T_j R_k + T_k R_j) = (T_j - T_k)(R_k - R_j)$$

Note that this method of choosing migrations based on immediate improvement requires the space of layouts to be convex. In other words, short term improvement must lead also to long term improvement. An example of a non-convex surface would be a small hill next to a large mountain. If you are at the top of the small hill and you want to reach the highest point in the landscape, you must descend first. As long as logical extent switches are considered as one movement, the space of layouts is convex. This convexity is fundamental to the proper operation of some embodiments.

The cost of migration may also be incorporated into migration decisions. Migrating to a better layout requires doing I/O, which slows the system temporarily. This cost can be estimated and subtracted from the immediate improvement of a migration in order to determine the net benefit. Note that change in average response time due to a layout change, e.g. $(T_i T_j)^*(R_i R_j)$ for switching two logical extents, is in units of I/O time per second, while the cost of migration is simply in units of I/O time. Therefore a change in average response time should be multiplied by some length of time, an improvement horizon, over which we expect to retain the immediate improvement. This horizon is over when the workload has changed so much that the migrated extents are no longer in near ideal locations. Net Migration Benefit with cost included may be computed as:

$$\text{Net Benefit} = (\text{Change in AvgRsptime})^*(\text{Migration Improvement Horizon}) - \text{Migration Cost}$$

If the net migration benefit is positive, it is worth doing the migration and if the net migration benefit is negative, it is not worth doing the migration. The goal in such embodiments is to find a sequence of migrations with a high net benefit, and there are several methods for doing so. A simple one of these methods iterates through all potential pairs of logical extents, evaluates the net benefit of switching each one, and returns the pair found with the highest net benefit. Unfortunately this method is computationally infeasible for situations with large numbers of extents as it grows as $N^2$. Large systems may commonly have hundreds of thousands of extents.

A faster method for choosing a migration only considers moving logical extents into their ideal location, according to the ideal layout computed as described above. This has the dual purpose of reducing the computational cost from $O(N^2)$ to $O(N \log N)$, and of reducing the number of steps to reach the ideal layout, since if the temperature and response times do not change then once a logical extent is moved it won't have to be moved again. The method is an approximate one, in that the move it finds is usually a very good one, but is not always the best.
1. Compute the ideal layout according to the algorithm given in the previous section.
2. Loop over all logical extents i
   a. Compute the net benefit of switching logical extent i with the logical extent occupying its ideal location, $(T_j - T_k)(R_k - R_j)$.
   b. If the net benefit is higher than the best net benefit found so far, then mark this switch as the best so far.
3. Return the best switch found. If its net benefit is positive, perform the migration. Otherwise wait until the temperature or response time measurements have changed, and then recompute.
4. Wait some amount of time (this wait period may be increased to throttle migration) then go to step 1.

Figure 3:
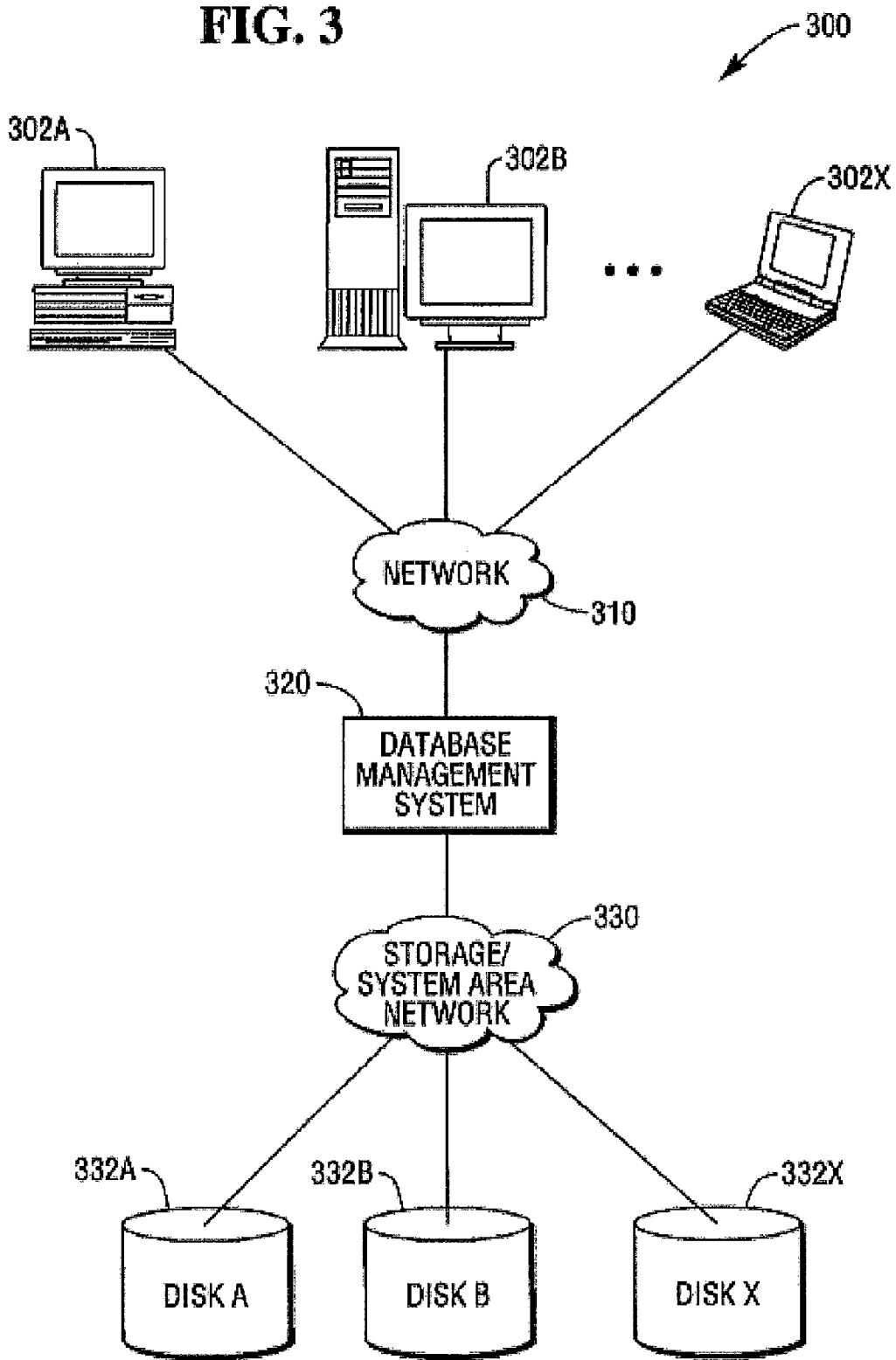
FIG. 3 illustrates a system according to an example embodiment.

FIG. 3 illustrates a system 300 according to an example embodiment. The system 300 is an example of interconnected devices that may be used to implement one or more of the embodiments described herein.

The system 300 includes client computing devices 302A, 302B, 302X. There computing devices 302A, 302B, 302X are intended to reflect that there can be any number of computing devices in the system 300. The computing devices 302A, 302B, 302X may include personal computers, handheld devices, and virtually any device capable of processing an instruction set to manipulate data.

The computing devices are connected to a network 310. The network 310 may be one or more both of a wired and wireless network. The network 310 may be a local area network, a wide area network, the Internet, or virtually any network capable of transporting data between two computing devices.

Also connected to the network 310 is a database management system 320. The database management system 320 may be a relational database management system, such as a high-performance database management system, or other database management system type. The database management system 320 is enabled according to the embodiments described herein to decouple logical data storage from physical data storage.

The data under management by the database management system 320 may reside on the same computing device as the database management system 320 or elsewhere within the system 300. For example, the data may be stored on one or more other computing devices that is accessible over a system area or storage area network 330. These other computing devices may include disk A 332A, disk B 332B, or disk X 332X. There may be any number of disks or storage devices that hold data under management by the database management system 320. When data is migrated by the database management system 320, data may not only be moved within a disk, but also from disk to disk.

Figure 4:
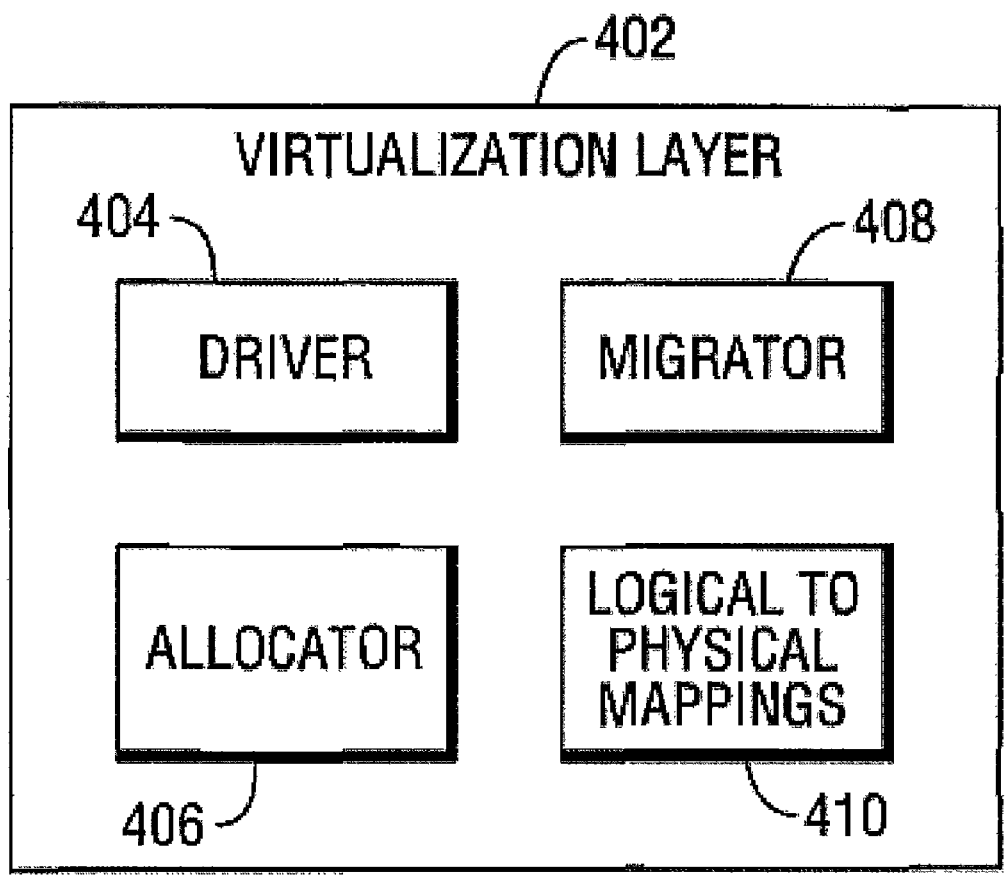
FIG. 4 is a block diagram of a data storage virtualization layer according to an example embodiment.

FIG. 4 is a block diagram of a data storage virtualization layer 402 according to an example embodiment. The virtualization layer 402 includes modules that perform the functions necessary to implement the various embodiments described herein. In some embodiments, the modules include a driver 404, an allocator module 406, a migrator module 408, and a mapping module 410.

In some embodiments, the driver 404 receives logical data access requests from users and translates those requests into physical addresses utilizing data stored in the mapping module 410, performs the requested data access, and provides a return to the calling user. The allocator module 406 handles allocation of data storage locations as described above. The migrator module 410 performs the monitoring and measuring of database performance to match logical extents and physical extents properly. The migrator module 410 also builds, chooses, and executes data migration plans. The virtualization layer 402 may include more or fewer modules depending on the particular embodiment.

FIG. 5 is a block flow diagram of a method 500 according to an example embodiment. The example method 500 is an automated method of organizing data in a database management system. The method 500 includes logically storing data in two or more logical data storage units 502 and physically storing the data in two or more physical data storage units 504, such as hard disks or portions of hard disks. The method 500 includes maintaining a mapping of the logical data storage units to the physical data storage units. Each logical data storage unit is mapped to one physical data storage unit 506. However, in some embodiments, a logical data storage unit may be mapped to two or more physical data storage units.

The method 500 further includes measuring a current input/output workload of each logical data storage unit 508 and measuring a data input/output rate of each physical data storage units 510. In some embodiments, the data input/output rate of each physical data storage unit is measure as data throughput per second. The current input/output workload of each logical data storage unit may be measured in as inputs and outputs per second.

The method then migrates data of a logical data storage unit with a higher input/output workload from a first physical data storage unit to a second physical data storage unit having a faster input/output rate than the first physical data storage unit 512. The migration of data also includes updating the mapping of the logical data unit of the migrated data from the first physical data storage unit to the second physical data storage unit 514.

In some database management system embodiments including an implementation of the method 500, data is accessed within the database management system by reference to logical data storage units and the database management system translates the logical data storage unit reference into a physical data storage unit address where the data is stored as a function of the mapping of logical data storage units to the physical data storage units.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. An automated method of organizing data in a database management system, the automated method comprising:
   logically storing data under management of the database management system in two or more logical data storage units;
   physically storing the data under management of the database management system in two or more physical data storage units;
   maintaining a mapping of logical data storage units to physical data storage units, each logical data storage unit mapped to one physical data storage unit;
   measuring a current input/output workload of each logical data storage unit;
   measuring a data input/output rate of each physical data storage unit;
   migrating, by a process of the database management system, data of a logical data storage unit with a higher input/output workload from a first physical data storage unit to a second physical data storage unit having a faster input/output rate than the first physical data storage unit; and
   updating the mapping of the logical data unit of the migrated data from the first physical data storage unit to the second physical data storage unit.

2. The method of claim 1, wherein a physical data storage unit is a portion of a hard disk data storage device.

3. The method of claim 1, wherein data is accessed within the database management system by reference to logical data storage units and the database management system translates the logical data storage unit reference into a physical data storage unit address where the data is stored as a function of the mapping of logical data storage units to the physical data storage units.

4. The method of claim 1, wherein the physical data storage units are all of equal size.

5. The method of claim 1, wherein the data input/output rate of each physical data storage unit is measured as data throughput per second.

6. The method of claim 1, wherein the current input/output workload of each logical data storage unit is measured in as inputs and outputs per second.

7. A system comprising:
one or more data storage devices operatively coupled to a computing device;
a database management system operative on the computing device to:
manage data stored in the one or more data storage devices by:
logically storing data under management of the database management system in two or more logical data storage units;
physically storing the data under management of the database management system in two or more physical data storage units;
maintaining a mapping of logical data storage units to physical data storage units, each logical data storage unit mapped to one physical data storage unit;
measuring a current input/output workload of each logical data storage unit;
measuring a data input/output rate of each physical data storage units;
migrating, by a process of the database management system, data of a logical data storage unit with a higher input/output workload from a first physical data storage unit to a second physical data storage unit having a faster input/output rate than the first physical data storage unit; and
updating the mapping of the logical data unit & the migrated data from the first physical data storage unit to the second physical data storage unit.

8. The system of claim 7, further comprising:
a network, and
wherein the one or more storage devices are operatively coupled to the computing device over the network.

9. The system of claim 1, wherein the physical storage units are portions of storage space within the one or more data storage devices.

10. The system of claim 1, wherein data is accessed within the database management system by reference to logical data storage units and the database management system translates the logical data storage unit reference into a physical data storage unit address where the data is stored as a function of the mapping of logical data storage units to the physical data storage units.

11. The system of claim 1, wherein the physical data storage units are of equal size.

12. A non-transitory computer-readable storage medium, within instructions stored thereon, that when processed, cause a suitably configured computer to:
logically storing data under management of a database management system in two or more logical data storage units;
physically storing the data under management of the database management system in the two or more physical data storage units;
maintaining a mapping of logical data storage units to physical data storage units, each logical data storage unit mapped to one physical data storage unit;
measure a current input/output workload of each of the two or more logical data storage units within the database management system;
measure a data input/output rate of each of two or more physical data storage units of at least one data storage device holding data managed by the database management system;
migrate data under management of the database management system and of a logical data storage unit with a higher input/output workload from a first physical data storage unit to a second physical data storage unit having a faster input/output rate than the first physical data storage unit; and
update the mapping of the logical data unit of the migrated data from the first physical data storage unit to the second physical data storage unit.

13. The non-transitory computer-readable storage medium of claim 12, wherein a physical data storage unit is a portion of a hard disk data storage device.

14. The non-transitory computer-readable storage medium of claim 12, wherein data is accessed within the database management system by reference to logical data storage units and the database management system translates the logical data storage unit reference into a physical data storage unit address where the data is stored as a function of the mapping of logical data storage units to the physical data storage units.

15. The non-transitory computer-readable storage medium of claim 12, wherein the physical data storage units are all of equal size.

16. The non-transitory computer-readable storage medium of claim 12, wherein:
the data input/output rate of each physical data storage unit is measured as data throughput per second; and
the current input/output workload of each logical data storage unit is measured in as inputs and outputs per second.

* * * * *